United States Patent
Bekele et al.

(10) Patent No.: US 8,206,818 B2
(45) Date of Patent: *Jun. 26, 2012

(54) POLYAMIDE MULTILAYER FILM

(75) Inventors: Solomon Bekele, Taylors, SC (US); Michael D. Esakov, Inman, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/592,306

(22) Filed: Nov. 23, 2009

(65) Prior Publication Data

US 2010/0075164 A1    Mar. 25, 2010

Related U.S. Application Data

(63) Continuation of application No. 10/835,792, filed on Apr. 30, 2004, now Pat. No. 7,645,505.

(51) Int. Cl.
*B32B 7/02* (2006.01)
(52) U.S. Cl. .................. 428/220; 428/474.4; 428/474.7; 428/474.9; 428/476.3
(58) Field of Classification Search .................. 428/220, 428/474.4, 474.7, 474.9, 476.3
See application file for complete search history.

(56) References Cited

U.S. PATENT DOCUMENTS

| | | |
|---|---|---|
| 3,763,082 A | 10/1973 | Elliott |
| 5,491,009 A | 2/1996 | Bekele |
| 5,534,277 A | 7/1996 | Ramesh et al. |
| 5,562,996 A | 10/1996 | Kuriu et al. |
| 6,046,330 A | 4/2000 | Qinghong et al. |
| 6,313,209 B2 | 11/2001 | Urabe et al. |
| 6,645,640 B1 | 11/2003 | Kuriu |

FOREIGN PATENT DOCUMENTS

JP    2028216    1/1990

OTHER PUBLICATIONS

EMS-Grivory, Provisional Data Sheet, Grivory FE 5746 Amorphous Polyamide (Jan. 2002).
EMS-Grivory, Data Sheet, Characteristics of Grivory G 21 Polyamide (Jul. 2000).

*Primary Examiner* — David Sample
*Assistant Examiner* — Lawrence Ferguson
(74) *Attorney, Agent, or Firm* — Daniel B. Ruble

(57) ABSTRACT

A multilayer film comprises first, second, and third layers. The second layer is directly adhered to the first and third layers. The first layer comprises at least about 40 wt % of one or more modified polyamides. The second layer comprises at least about 40 wt % of one or more unmodified polyamides. The third layer comprises at least about 40 wt % of one or more selected tie polymers. The film may comprise one or more UV light absorbers. The film has good intra-film bond strength.

23 Claims, No Drawings

POLYAMIDE MULTILAYER FILM

This application is a continuation of U.S. patent application Ser. No. 10/835,792 filed Apr. 30, 2004, now U.S. Pat. No. 7,645,505 which is incorporated herein in its entirety by reference.

BACKGROUND OF THE INVENTION

The present invention relates to multilayer packaging films comprising modified polyamide.

A film layer comprising polyamide may be useful in providing enhanced oxygen barrier attributes to a packaging film. One such polyamide is an amorphous polyamide such as nylon-6,I/6,T. This polyamide normally has equal amounts of the free amino end group (i.e., the —NH2 end group) and the free carboxyl end group (i.e., the —COOH end group). However, these end groups in some environments may react to form salts or react with other polymer functional groups. For example, one or both of the free end groups of the polyamide may tend to react with the contents of a package incorporating the polyamide.

It may therefore be useful to provide the polyamide with one or more of the free end groups of the polyamide chain being modified or "capped" to a desired degree. For example, the free amino end group and/or the free carboxyl end group of the polyamide chain may be preferentially modified or "capped" to reduce the reactivity of the polyamide. The modified polyamide may provide a reduced reactivity with the packaged contents.

However, a film layer comprising such a modified polyamide may have an unacceptably lowered adhesion strength to an adjacent film layer. For example, it is known to provide a film having a modified amorphous nylon-6,I/6,T layer adjacent to an anhydride-modified polyolefin tie layer; however, such a film has unacceptably low bond strength between these layers.

SUMMARY OF THE INVENTION

The present invention may address one or more of the aforementioned problems. A multilayer film comprises first, second, and third layers. The second layer is directly adhered to the first and third layers. The first layer comprises at least about 40% of one or more modified polyamides, based on the weight of the first layer. The second layer comprises at least about 40% of one or more unmodified polyamides, based on the weight of the second layer. The third layer comprises at least about 40% of one or more tie polymers selected from ethylene/vinyl acetate copolymer, ethylene/(meth)acrylic acid copolymer, ethylene/$C_1$-$C_{12}$ alkyl (meth)acrylate copolymer, and anhydride-modified polyolefin, based on the weight of the third layer. The film may comprise one or more UV light absorbers.

In one aspect, a packaging film comprises: a) one or more thermoplastic polymers, b) 2-(2Hydroxy-3-tert-butyl-5-methylphenyl)-5-chlorobenzotriazole, and c) 2-[2-Hydroxy-3,5-di-(1,1-dimethylbenzyl)phenyl]-2H-benzotriazole.

These and other objects, advantages, and features of the invention will be more readily understood and appreciated by reference to the detailed description of the invention.

DETAILED DESCRIPTION OF THE INVENTION

The film of the present invention may comprise a first layer comprising modified polyamide, a second layer comprising unmodified polyamide, and a third layer comprising tie polymer. The film of the present invention may comprise at least any of the following numbers of layers: 3, 4, 5, 7, 9; and may comprise at most any of the following numbers of layers: 4, 5, 6, 7, 8, 9, 11, 13, and 15. As used herein, the term "layer" refers to a discrete film component which is substantially coextensive with the film and has a substantially uniform composition. Where two or more directly adjacent layers have essentially the same composition, then these two or more adjacent layers may be considered a single layer for the purposes of this application.

The film may have a thickness of less than about any of the following: 20 mils, 10 mils, 5 mils, 4 mils, 3 mils, 2 mils, 1.5 mils, 1.2 mils, and 1 mil. The film may also have a thickness of at least about any of the following: 0.25 mils, 0.3 mils, 0.35 mils, 0.4 mils, 0.45 mils, 0.5 mils, 0.6 mils, 0.75 mils, 0.8 mils, 0.9 mils, 1 mil, 1.2 mils, 1.4 mils, 1.5 mils, 2 mils, 3 mils, and 5 mils.

First Layer of the Film

The first layer may be directly adhered to at least the second layer. A layer that is "directly adhered" to another means that there is no intervening layer or adhesive layer between the layers. The first layer may comprise one or more modified polyamides (described below), such as one or more modified amorphous polyamides (also described below).

The first layer may comprise at least about any of the following amounts of one or more of any of the modified polyamides, such as one or more of any of the modified amorphous polyamides, which are described in this Application: 40%, 50%, 60%, 70%, 80%, 90%, 95%, and 100%, based on the weight of the first layer. The first layer may consist essentially of one or more modified polyamides or may consist of one or more modified polyamides. The first layer may comprise at most about any of the following amounts of one or more of any of the modified polyamides, such as one or more of any of the modified amorphous polyamides, which are described in the Application: 95%, 90%, 80%, 70%, 60%, and 50%, based on the weight of the first layer. The first layer may consist essentially of one or more modified amorphous polyamides or may consist of one or more modified amorphous polyamides.

The amount of modified polyamide, such as modified amorphous polyamide, in the first layer may be sufficient to impart to the film comprising the first layer an oxygen transmission rate of at most about any of the following values: 150, 100, 50, 45, 40, 35, 30, 25, 20, 15, 10, and 5 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985.

The first layer may have a thickness of at least about any of the following values:

0.05 mils, 0.1 mils, 0.15 mils, 0.2 mils, 0.25 mils, 0.3 mils, 0.35 mils, 0.4 mils, 0.45 mils, 0.5 mils, and 0.6 mils. The first layer may have a thickness of at most about any of the following values: 5 mils, 4 mils, 3 mils, 2 mils, 1 mil, 0.7 mils, 0.5 mils, and 0.3 mils. The thickness of the first layer as a percentage of the total thickness of the film may be at most and/or at least about any of the following values: 50%, 40%, 30%, 25%, 20%, 15%, 10%, and 5%.

Second Layer of the Film

The second layer may be directly adhered to the first and third layers. The second layer may comprise one or more of any of the unmodified polyamides described in this Application in at least about any of the following amounts: 40%, 45%, 50%, 55%, 60%, 65%, 70%, 75%, 80%, 85%, 90%, 95%, and 100%; and/or in at most about any of the following amounts: 98%, 95%, 90%, 85%, 80%, 75%, 70%, 65%, 60%, 55%, 50%, and 45%, based on the weight of the second layer. The second layer may consist essentially of one or more unmodified polyamide, or may consist of one or more unmodified polyamide.

The second layer may comprise one or more of any of the modified polyamides, such as one or more of any of the modified amorphous polyamide, which described in this Application in at least about any of the following amounts: 5%, 10%, 15%, 20%, 25%, 30%, 35%, 40%, 45%, 50%, 55%, and 60%; and/or in at most about any of the following amounts: 98%, 95%, 90%, 85%, 80%, 75%, 70%, 65%, 60%, 55%, 50%, and 45%, based on the weight of the second layer.

The weight ratio of unmodified polyamide to modified polyamide in the second layer may be at least about any of the following: 1:1, 1.5:1, 2:1, 3:1, 3.5:1, 4:1, 4.5:1, 5:1, 6:1, 7:1, 8:1, 9:1, and 10:1; and/or at most about any of the following weight ratios: 40:1, 35:1, 30:1, 25:1, 20:1, 15:1, 10:1, and 8:1.

The second layer may have a thickness of at least about any of the following values: 0.05 mils, 0.1 mils, 0.15 mils, 0.2 mils, 0.25 mils, 0.3 mils, 0.35 mils, 0.4 mils, 0.45 mils, 0.5 mils, and 0.6 mils. The second layer may have a thickness of at most about any of the following values: 5 mils, 4 mils, 3 mils, 2 mils, 1 mil, 0.7 mils, 0.5 mils, and 0.3 mils. The thickness of the second layer as a percentage of the total thickness of the film may be at most about and/or at least about any of the following values: 50%, 40%, 30%, 25%, 20%, 15%, 10%, and 5%.

Third Layer of the Film

The third layer of the film may be directly adhered to at least the second layer of the film. The third layer may function as a tie layer, tying the second layer to a fourth layer of the film. A "tie" layer may be considered an inner or internal film layer having the primary purpose of improving the adherence of one layer or portion of a film to another layer or portion of the film. An "internal" or "inner" layer of a film has both surfaces of the layer directly adhered to other layers of the film. For example, the third layer may be positioned between and directly adhered to both the second and fourth layers to enhance the bond strength of the second layer to the fourth layer, relative to the inter-layer bond strength that would occur, for example, if the second and fourth film layers were directly adhered to each other. The third layer may be directly adhered to an outer layer of the film. An "outer layer" of a film is one that has only one side directly adhered to another layer of the film.

The third layer may comprise at least about and/or at most about any of the following amounts of one or more tie polymers such as any of those described below: 40%, 50%, 60%, 70%, 80%, 90%, 95%, and 100%, based on the weight of the third layer. The third layer may consist essentially of one or more tie polymers or may consist of one or more tie polymers.

The third layer may have a thickness of at least about any of the following values: 0.05 mils, 0.1 mils, 0.15 mils, 0.2 mils, 0.25 mils, 0.3 mils, 0.35 mils, 0.4 mils, 0.45 mils, 0.5 mils, and 0.6 mils. The third layer may have a thickness of at most about any of the following values: 3 mils, 2 mils, 1 mil, 0.7 mils, 0.5 mils, and 0.3 mils. The thickness of the third layer as a percentage of the total thickness of the film may be at least about and/or at most about any of the following values: 50%, 40%, 30%, 25%, 20%, 15%, 10%, and 5%.

Fourth and Additional Layers of the Film

A fourth layer may be directly adhered to the third layer. One or more additional layers may be adhered to the fourth layer. The fourth layer, or any of the one or more additional layer, may comprise at least about and/or at most about any of the polymers described in this Application in any of the following weight percent values: 10, 20, 30, 40, 50, 60, 70, 80, 90, 95, 99 and 100% by weight of the layer.

Such polymers include thermoplastic polymers, for example, polyolefins (e.g., polyethylene, polypropylene), ethylene/vinyl alcohol copolymers, ionomers, vinyl plastics (e.g., polyvinyl chloride, polyvinylidene chloride), polyamides, and polyesters. These thermoplastic polymers are discussed below in more detail.

The fourth layer or any of the one or more additional layers may have a thickness of at least about any of the following values: 0.05 mils, 0.1 mils, 0.15 mils, 0.2 mils, 0.25 mils, 0.3 mils, 0.35 mils, 0.4 mils, 0.45 mils, 0.5 mils, 0.6 mils, 1, 3, 7, 9, and 11 mils. The fourth layer or any of the one or more additional layers may have a thickness of at most about any of the following values: 15, 13, 11, 9, 7, 5 mils, 4 mils, 3 mils, 2 mils, 1 mil, 0.7 mils, 0.5 mils, and 0.3 mils. The thickness of the fourth layer or any of the one or more additional layers as a percentage of the total thickness of the film may be at most about and/or at least about any of the following values: 50%, 40%, 30%, 25%, 20%, 15%, 10%, 5%, 3%, and 2%.

Below are some examples of combinations in which the alphabetical symbols designate the film layers. Where the film representation below includes the same letter more than once, each occurrence of the letter may represent the same composition or a different composition that is within the description associated with the identified layer.

A/B/C; C/B/A/B/C; A/B/C/D; D/C/B/A/B/C/D;
D/C/B/A/B/C/D/E; E/D/C/B/A/B/C/D/E

"A" is a layer as described for the first layer, as discussed above.

"B" is a layer as described for the second layer, as discussed above.

"C" is a layer as described for the third layer, as discussed above.

"D" is a layer as described for the fourth layer, as discussed above.

"E" is one or more additional layers, as discussed above.

Bond Strengths of the Film

The term "inter-layer bond strength" as used herein means the amount of force required to separate or delaminate two adjacent film layers by adhesive failure, as measured in accordance with ASTM F88-94 where the Instron tensile tester crosshead speed is 10 inches per minute, using five, 1-inch wide, representative samples. An "adhesive failure" is a failure in which the interfacial forces (e.g., valence forces or interlocking action or both) holding two surfaces together are overcome. The weakest of the inter-layer bond strengths of the film may be at least about any of the following: 0.2, 0.3, 0.4, 0.5, 0.6, 0.7, 0.8, 0.9, 1, 1.5, 2, 2.5, 3, 3.5, 4, 4.5 pounds/inch.

The term "intra-layer cohesive strength" as used herein means the amount of force required to separate a film layer by cohesive failure, as measured in a direction that is perpendicular to the plane of the film and in accordance with ASTM F88-94 where the Instron tensile tester crosshead speed is 10 inches per minute, using five, 1-inch wide, representative samples.

The term "intra-film bond strength" refers to the internal force with which a film remains intact, as measured in a direction that is perpendicular to the plane of the film. In a multilayer film, intra-film bond strength is provided both by inter-layer adhesion (i.e., the inter-layer bond strength) and by the intra-layer cohesion of each film layer (i.e., the intra-layer cohesive strength). The intra-film bond strength of the film may be at least about any of the following: 1, 1.5, 2, 2.5, 3, 3.5, 4, 4.5 pounds/inch.

Polyamides

Exemplary polyamides include those of the type that may be formed by the polycondensation of one or more diamines with one or more diacids and/or of the type that may be formed by the polycondensation of one or more amino acids. Useful polyamides include aliphatic polyamides and aliphatic/aromatic polyamides.

Representative aliphatic diamines for making polyamides include those having the formula:

$H_2N(CH_2)_nNH_2$ where n has an integer value of 1 to 16. Representative examples include trimethylenediamine, tetramethylenediamine, pentamethylenediamine, 2-methylpentamethylenediamine ("MPMD"), hexamethylenediamine, 2,2,4- and 2,4,4-trimethylhexamethylenediamine ("TMD"), octamethylenediamine, decamethylenediamine, dodecamethylenediamine, hexadecamethylenediamine. Representative aromatic diamines include m-phenylenediamine ("MPD"), p-phenylenediamine ("PPD"), m-xylylenediamine ("MXD"), 4,4'-diaminodiphenyl ether, 4,4' diaminodiphenyl sulphone, 4,4'-diaminodiphenylethane. Representative alkylated diamines include 2,2-dimethylpentamethylenediamine, 2,2,4-trimethylhexamethylenediamine and 2,4,4-trimethylhexamethylenediamine, and 2,4,4 trimethylpentamethylenediamine. Representative cycloaliphatic diamines include diaminodicyclohexylmethane. Other useful diamines include heptamethylenediamine, nonamethylenediamine, and the like.

Representative diacids for making polyamides include dicarboxylic acids, which may be represented by the general formula:

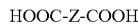

HOOC-Z-COOH where Z is representative of a divalent aliphatic radical containing at least 2 carbon atoms. Representative examples include adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid ("I") and terephthalic acid ("T").

The polycondensation reaction product of one or more or the above diamines with one or more of the above diacids may form useful polyamides. Representative polyamides of the type that may be formed by the polycondensation of one or more diamines with one or more diacids include aliphatic polyamides such as poly(hexamethylene adipamide) ("nylon-6,6"), poly(hexamethylene sebacamide) ("nylon-6,10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9,9"), poly(decamethylene azelamide) ("nylon-10,9"), poly(tetramethylenediamine-co-oxalic acid) ("nylon-4,2"), the polyamide of n-dodecanedioic acid and hexamethylenediamine ("nylon-6,12"), the polyamide of dodecamethylenediamine and n-dodecanedioic acid ("nylon-12,12").

Representative aliphatic/aromatic polyamides include poly(tetramethylenediamine-co-isophthalic acid) ("nylon-4, I"), polyhexamethylene isophthalamide ("nylon-6,I"), poly (trimethylhexamethylene terephthalamide) ("nylon-TMD, T"), poly(m-xylylene adipamide) ("nylon-MXD,6"), poly(p-xylylene adipamide), poly(hexamethylene terephthalamide), poly(dodecamethylene terephthalamide), and nylon-MXD,I.

Representative polyamides of the type that may be formed by the polycondensation of one or more amino acids include poly(4-aminobutyric acid) ("nylon-4"), poly(6-aminohexanoic acid) ("nylon-6" or "poly(caprolactam)"), poly(7-aminoheptanoic acid) ("nylon-7"), poly(8-aminooctanoic acid) ("nylon-8"), poly(9-aminononanoic acid) ("nylon-9"), poly (10-aminodecanoic acid) ("nylon-10"), poly(11-aminoundecanoic acid) ("nylon-11"), and poly(12-aminododecanoic acid) ("nylon-12").

Representative copolyamides include copolymers based on a combination of the monomers used to make any of the foregoing polyamides, such as, nylon-4/6, nylon-6/6, nylon-6/9, caprolactam/hexamethylene adipamide copolymer ("nylon-6,6/6"), hexamethylene adipamide/caprolactam copolymer ("nylon-6/6,6"), trimethylene adipamide/hexamethylene azelaiamide copolymer ("nylon-trimethyl 6,2/6,2"), hexamethylene adipamide-hexamethylene-azelaiamide caprolactam copolymer ("nylon-6,6/6,9/6"), hexamethylene adipamide/hexamethylene-isophthalamide ("nylon-6,6/6,I"), hexamethylene adipamide/hexamethyleneterephthalamide ("nylon-6,6/6,T"), nylon-6,T/6,I, nylon-6/MXD,T/MXD,I, nylon-6,6/6,10, and hexamethylene isophthalamide/hexamethylene terephthalamide (nylon-6,I/6,T).

Conventional nomenclature typically lists the major constituent of a copolymer before the slash ("/") in the name of a copolymer; however, in this application the constituent listed before the slash is not necessarily the major constituent unless specifically identified as such. For example, unless the application specifically notes to the contrary, "nylon-6/6,6" and "nylon-6,6/6" may be considered as referring to the same type of copolyamide.

Polyamide copolymers may include the most prevalent polymer unit in the copolymer (e.g., hexamethylene adipamide as a polymer unit in the copolymer nylon-6,6/6) in mole percentages ranging from any of the following: at least about 50%, at least about 60%, at least about 70%, at least about 80%, and at least about 90%, and the ranges between any of the forgoing values (e.g., from about 60 to about 80%); and may include the second most prevalent polymer unit in the copolymer (e.g., caprolactam as a polymer unit in the copolymer nylon-6,6/6) in mole percentages ranging from any of the following: less than about 50%, less than about 40%, less than about 30%, less than about 20%, less than about 10%, and the ranges between any of the forgoing values (e.g., from about 20 to about 40%).

Useful polyamides include those that are approved by the controlling regulating agency (e.g., the U.S. Food and Drug Agency) for either direct contact with food and/or for use in a food packaging film, at the desired conditions of use.

Modified Polyamide

As used herein, the term "modified polyamide" refers to a polyamide such as any of those described above that has had one or more of the free amino end groups (i.e., the —NH2 end group) or the free carboxyl end groups (i.e., the —COOH end group) of the polyamide chain being masked, protected, or capped to a desired degree to render the resulting end group less reactive.

The reactivity of the free amino end group of the polyamide may be due to its acting as a source of nucleophilicity or a weakly acidic hydrogen. This reactivity may be reduced by acylation of the free amino group with an amino-protecting group. Representative amino-protecting groups include: carbobenzyloxy, t-butoxycarbonyl, trifluoroacetyls, and 4 or 2,4-dimethoxyphenyl.

The reactivity of the free carboxyl end group may be reduced, for example, by esterification of the hydroxyl (—OH) moiety of the carboxyl end group. For example, the end group may be reacted to form a t-butyl ester or a 2,2,2-trichloroethyl ester. The reactivity of the free carboxyl end group may also be reduced, for example, by masking the carbonyl group of a carboxyl group by conversion to an oxazoline derivative, for example, a 4,4-dimethyl oxazoline derivative. The free carboxyl group may also be protected as an orthoester, for example, as a 4-methyl-2,6,7-trioxabicyclooctane orthoester.

Such modifications of the free end groups of a polyamide and related methods are known in the art, and therefore are not discussed in more detail here. See, for example, Chapter 3 of F. Carey and R. Sundberg, Advanced Organic Chemistry ($3^{rd}$ edition, Plenum Press, 1997), of which Chapter 3 is incorporated herein in its entirety by reference.

An "unmodified polyamide" refers to a polyamide, such as any of those described above, that is not a modified polyamide. For example, an unmodified polyamide may be characterized as having essentially all of the free amino and free carboxyl end groups in an unmodified state so that there is essentially a 1:1 mole ratio of free amino end groups to free carboxyl end groups.

For a modified polyamide, the extent of modification may vary. For example, the amount of modified amino end groups, expressed as a mole percentage of the total amount of free and modified amino end groups, may be at least about and/or at most about any of the following values: 5, 10, 15, 20, 30, 40, 50, 60, 70, 80, 90, 95, and 100 mole %. Also by way of example, the amount of modified carboxyl end groups, expressed as a mole percentage of the total amount of free and modified carboxyl end groups may be at least about and/or at most about any of the following values: 5, 10, 15, 20, 30, 40, 50, 60, 70, 80, 90, 95, and 100 mole %.

The mole ratio of free amino end groups to free carboxyl end groups for the modified polyamide resin may be less than about, or at most about, any of the following: 5:100, 10:100, 15:100, 20:100, 30:100, 40:100, 50:100, 60:100, 70:100, 80:100, 90:100, and 95:100. The mole ratio of free carboxyl end groups to free amino end groups for the modified polyamide resin may be less than about, or at most about, any of the following: 5:100, 10:100, 15:100, 20:100, 30:100, 40:100, 50:100, 60:100, 70:100, 80:100, 90:100, and 95:100.

Polyamide Crystallinity

A "crystalline" polyamide (e.g., a semi-crystalline polyamide) may be distinguished from an "amorphous" polyamide, for example, by the following test. A non-stretched film specimen of the subject polyamide (100 microns in thickness) is subjected to X-ray diffraction in a chamber at 22° C. and 50% relative humidity using a goniometer and passing a current of 60 mA at a voltage of 30 KV under the conditions of scanning angle of 5° to 40°, scanning rate of 3°/min and slit at 1°, 1°, 0.15° from the specimen side. If the film does not indicate a crystal peak, the polyamide may be considered an amorphous polyamide. If the film indicates one or more crystal peaks, the polyamide may be considered a crystalline polyamide.

Further, an amorphous material, such as amorphous polyamide, does not clearly display a melting point. References to the melting point of a polymer, a resin, or a film layer in this application refer to the melting peak temperature of the dominant melting phase of the polymer, resin, or layer as determined by differential scanning calorimetry according to ASTM D-3418.

Exemplary amorphous polyamides are nylon-6,I/6,T; nylon-TMD,T (available from Degussa Corporation under the Troamid T trademark); and also certain aliphatic and cycloaliphatic polyamides available from EMS-Grivory under the Grilamid TR trademark.

Exemplary crystalline polyamides include nylon-6; nylon-6,6; nylon-6,12; nylon-12; nylon-6,6/6.

The modified polyamide may be a modified amorphous polyamide or a modified crystalline polyamide.

Tie Polymers

Useful tie polymers include thermoplastic polymers that are compatible with the polyolefin that may be present in a fourth layer directly adhered to the third layer, yet have polar characteristics sufficient to provide enhanced adhesion to the polyamide of the second layer.

Examples of tie polymers include:

1. Ethylene/vinyl acetate copolymer (EVA), for example, having a vinyl acetate content of at least about any of the following weight % amounts: 3%, 5%, 10%, 15%, 20%, 22%, 24%, and 25%; and for example at most about any of the following weight % amounts: 30%, 28%, 25%, 22%, 20%, 15%, and 10%. EVA also includes, for example, ethylene/vinyl acetate/carbon monoxide terpolymer, for example, having carbon monoxide content of at least about any of the following weight % amounts: 0.1%, 0.5%, 1%, 1.5%, and 2%; and for example at most about any of the following weight % amounts: 5%, 4%, 3%, 2%, and 1%, all based on the weight of the polymer.

2. Ethylene/(meth)acrylic acid copolymers (e.g., ethylene/acrylic acid polymer, ethylene/methacrylic acid copolymer), such as any of those described elsewhere in this Application, for example, an ethylene/acrylic acid available from Dow Corporation under the PRIMACOR 1410 trademark and an ethylene/methylacrylate/acrylic acid terpolymer available from ExxonMobil under the Escor 310 and Escor 320 trademarks;

3. Ethylene/$C_1$-$C_{12}$ alkyl (meth)acrylate copolymers (e.g., ethylene/methyl acrylate copolymer, ethylene/butyl acrylate copolymer, ethylene/methyl methacrylate copolymer), such as any of those described elsewhere in this Application, for example, ethylene/methyl acrylate copolymer having a methyl acrylate content of at least about any of the following: 5, 10, 15, and 20 weight % (e.g., the resin available from the Eastman Chemical Company under the EMAC+SP1305 trademark), also for example, where the copolymer is a block copolymer comprising at least about 20 weight % (meth)acrylate monomer; and 4. Polymers modified (e.g., grafted) with unsaturated carboxylic acid anhydride (i.e., anhydride-modified polymer) to incorporate anhydride functionality, which promotes or enhances the adhesion characteristics of the polymer. Examples of unsaturated carboxylic acid anhydrides include maleic anhydride, fumaric anhydride, and unsaturated fused ring carboxylic acid anhydrides (e.g., as described in U.S. Pat.

No. 4,087,588, which is incorporated herein in its entirety by reference). Examples of anhydride-modified polymers include the anhydride-modified version of any of the polymers listed above in numbers 1-3 as well as any of the other polyolefins (e.g., ethylene homopolymer, ethylene/alpha-olefin copolymer, ethylene/unsaturated ester copolymer, and ethylene/(meth)acrylic acid copolymer) described in this Application, thus including anhydride-modified ethylene homo- and co-polymers and propylene homo- and co-polymers.

Examples of anhydride-modified tie polymers also include: a) maleic anhydride-grafted linear low density polyethylene available from Rhom and Haas under the TYMOR 1228B trademark, b) maleic anhydride-grafted ethylene/vinyl acetate copolymer available from Dupont Corporation under the BYNEL 3861 trademark, c) ADMER resin (Mitsui Petrochemical Corp; Tokyo, Japan), d) PLEXAR 360 RESIN (Quantum Co.; Cincinnati, Ohio), and e) the LOTADER series of ethylene/alkyl acrylate/ maleic anhydride interpolymers (Elf-Atochem, Inc.; Buffalo, N.Y.). Anhydride-modified polymer may be made by grafting or copolymerization, as is known in the art.

Useful anhydride-modified polymers may contain anhydride moiety in an amount (based on the weight of the modified polymer) of at least about any of the following: 0.1%, 0.5%, 1%, and 2%; and at most about any of the following: 10%, 7.5%, 5%, and 4%.

Polyolefins

Useful polyolefins include ethylene homo- and co-polymers and propylene homo-and co-polymers. The term "polyolefins" includes copolymers that contain at least 50 mole % monomer units derived from olefin. Ethylene homopolymers include high density polyethylene ("HDPE") and low density polyethylene ("LDPE"). Ethylene copolymers include ethylene/alpha-olefin copolymers ("EAOs"), ethylene/unsaturated ester copolymers, and ethylene/(meth)acrylic acid. ("Copolymer" as used in this application means a polymer derived from two or more types of monomers, and includes terpolymers, etc.)

EAOs are copolymers of ethylene and one or more alpha-olefins, the copolymer having ethylene as the majority mole-percentage content. The comonomer may include one or more $C_3$-$C_{20}$ α-olefins, one or more $C_4$-$C_{12}$ α-olefins, and one or more $C_4$-$C_8$ α-olefins. Useful α-olefins include 1-butene, 1-hexene, 1-octene, and mixtures thereof.

EAOs include one or more of the following: 1) medium density polyethylene ("MDPE"), for example having a density of from 0.926 to 0.94 g/cm3; 2) linear medium density polyethylene ("LMDPE"), for example having a density of from 0.926 to 0.94 g/cm3; 3) linear low density polyethylene ("LLDPE"), for example having a density of from 0.915 to 0.930 g/cm3; 4) very-low or ultra-low density polyethylene ("VLDPE" and "ULDPE"), for example having density below 0.915 g/cm3, and 5) homogeneous EAOs. Useful EAOs include those having a density of less than about any of the following: 0.925, 0.922, 0.92, 0.917, 0.915, 0.912, 0.91, 0.907, 0.905, 0.903, 0.9, and 0.898 grams/cubic centimeter. Unless otherwise indicated, all densities herein are measured according to ASTM D1505.

The polyethylene polymers may be either heterogeneous or homogeneous. As is known in the art, heterogeneous polymers have a relatively wide variation in molecular weight and composition distribution. Heterogeneous polymers may be prepared with, for example, conventional Ziegler-Natta catalysts.

On the other hand, homogeneous polymers are typically prepared using metallocene or other single-site catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions. Examples of homogeneous polymers include the metallocene-catalyzed linear homogeneous ethylene/alpha-olefin copolymer resins available from the Exxon Chemical Company (Baytown, Tex.) under the EXACT trademark, linear homogeneous ethylene/alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark.

Another useful ethylene copolymer is ethylene/unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl (meth)acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl (meth)acrylate) comonomer content of the ethylene/unsaturated ester copolymer may range from about 6 to about 18 weight %, and from about 8 to about 12 weight %, based on the weight of the copolymer. Useful ethylene contents of the ethylene/unsaturated ester copolymer include the following amounts: at least about 82 weight %, at least about 85 weight %, at least about 88 weight %, no greater than about 94 weight %, no greater than about 93 weight %, and no greater than about 92 weight %, based on the weight of the copolymer.

Representative examples of ethylene/unsaturated ester copolymers include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer is ethylene/(meth) acrylic acid, which is the copolymer of ethylene and acrylic acid, methacrylic acid, or both.

Useful polyolefins also include cyclo-olefin copolymers ("COCs"), such as ethylene/norbornene copolymers, for example, those polymerized from norbornene and ethylene using metallocene catalyst. Ethylene/norbornene copolymers are available from Ticona GmbH under the TOPAS trademark. Ethylene/norbornene copolymers may have at least about, and/or at most about, any of the following amounts of norbornene content by mole %: 20, 30, 32, 35, 50, 55, and 60%.

Useful propylene copolymer includes propylene/ethylene copolymers ("EPC"), which are copolymers of propylene and ethylene having a majority weight % content of propylene, such as those having an ethylene comonomer content of less than 10%, less than 6%, and at least about 2% by weight.

EVOH

Ethylene/vinyl alcohol copolymer ("EVOH") is another useful thermoplastic. EVOH may have an ethylene content of about 32%, or at least about any of the following values: 20%, 25%, and 30% by weight. EVOH may have an ethylene content of at most about any of the following values: 40%, 35%, and 33% by weight. EVOH may include saponified or hydrolyzed ethylene/vinyl acetate copolymers, such as those having a degree of hydrolysis of at least about any of the following values: 50% and 85%.

Ionomer

Another useful thermoplastic is ionomer, which is a copolymer of ethylene and an ethylenically unsaturated monocarboxylic acid having the carboxylic acid groups partially neutralized by a metal ion, such as sodium or zinc. Useful ionomers include those in which sufficient metal ion is present to neutralize from about 10% to about 60% of the acid groups in the ionomer. The carboxylic acid is preferably "(meth)acrylic acid" —which means acrylic acid and/or methacrylic acid. Useful ionomers include those having at least 50 weight % and preferably at least 80 weight % ethylene units. Useful ionomers also include those having from 1 to 20 weight percent acid units. Useful ionomers are available, for example, from Dupont Corporation (Wilmington, Del.) under the SURLYN trademark.

Vinyl Plastics

Useful vinyl plastics include polyvinyl chloride ("PVC"), vinylidene chloride polymer ("PVdC"), and polyvinyl alcohol ("PVOH"). Polyvinyl chloride ("PVC") refers to a vinyl chloride-containing polymer or copolymer—that is, a polymer that includes at least 50 weight percent monomer units derived from vinyl chloride ($CH_2$=CHCl) and also, optionally, one or more comonomer units, for example, derived from vinyl acetate. One or more plasticizers may be compounded with PVC to soften the resin and/or enhance flexibility and processibility. Useful plasticizers for this purpose are known in the art.

Another exemplary vinyl plastic is vinylidene chloride polymer ("PVdC"), which refers to a vinylidene chloride-containing polymer or copolymer—that is, a polymer that includes monomer units derived from vinylidene chloride ($CH_2$=$CCl_2$) and also, optionally, monomer units derived from one or more of vinyl chloride, styrene, vinyl acetate, acrylonitrile, and $C_1$-$C_{12}$ alkyl esters of (meth)acrylic acid (e.g., methyl acrylate, butyl acrylate, methyl methacrylate). As used herein, "(meth)acrylic acid" refers to both acrylic acid and/or methacrylic acid; and "(meth)acrylate" refers to both acrylate and methacrylate. Examples of PVdC include one or more of the following: vinylidene chloride homopolymer, vinylidene chloride/vinyl chloride copolymer ("VD-CNC"), vinylidene chloride/methyl acrylate copolymer, vinylidene chloride/ethyl acrylate copolymer, vinylidene chloride/ethyl methacrylate copolymer, vinylidene chloride/methyl methacrylate copolymer, vinylidene chloride/butyl acrylate copolymer, vinylidene chloride/styrene copolymer, vinylidene chloride/acrylonitrile copolymer, and vinylidene chloride/vinyl acetate copolymer.

Useful PVdC includes that having at least about 75, at most about 95, and at most about 98 weight % vinylidene chloride monomer. Useful PVdC (for example, as applied by latex emulsion coating) includes that having at least about any of 5%, 10%, and 15% —and/or at most about any of 25%, 22%, 20%, and 15 weight % —comonomer with the vinylidene chloride monomer.

A layer that includes PVdC may also include a thermal stabilizer (e.g., a hydrogen chloride scavenger such as epoxidized soybean oil) and a lubricating processing aid (e.g., one or more acrylates).

Polyesters

Useful polyesters include those made by: 1) condensation of polyfunctional carboxylic acids with polyfunctional alcohols, 2) polycondensation of hydroxycarboxylic acid, and 3) polymerization of cyclic esters (e.g., lactone).

Exemplary polyfunctional carboxylic acids (and their derivatives such as anhydrides or simple esters like methyl esters) include aromatic dicarboxylic acids and derivatives (e.g., terephthalic acid, isophthalic acid, dimethyl terephthalate, dimethyl isophthalate) and aliphatic dicarboxylic acids and derivatives (e.g., adipic acid, azelaic acid, sebacic acid, oxalic acid, succinic acid, glutaric acid, dodecanoic diacid, 1,4-cyclohexane dicarboxylic acid, dimethyl-1,4-cyclohexane dicarboxylate ester, dimethyl adipate). Useful dicarboxylic acids also include those discussed above in the polyamide section. As is known to those of skill in the art, polyesters may be produced using anhydrides and esters of polyfunctional carboxylic acids.

Exemplary polyfunctional alcohols include dihydric alcohols (and bisphenols) such as ethylene glycol, 1,2-propanediol, 1,3-propanediol, 1,3 butanediol, 1,4-butanediol, 1,4-cyclohexanedimethanol, 2,2-dimethyl-1,3-propanediol, 1,6-hexanediol, poly(tetrahydroxy-1,1'-biphenyl, 1,4-hydroquinone, and bisphenol A.

Exemplary hydroxycarboxylic acids and lactones include 4-hydroxybenzoic acid, 6-hydroxy-2-naphthoic acid, pivalolactone, and caprolactone.

Useful polyesters include homopolymers and copolymers. These may be derived from one or more of the constituents discussed above. Exemplary polyesters include poly(ethylene terephthalate) ("PET"), poly(butylene terephthalate) ("PBT"), and poly(ethylene naphthalate) ("PEN"). If the polyester includes a mer unit derived from terephthalic acid, then such mer content (mole %) of the diacid of the polyester may be at least about any the following: 70, 75, 80, 85, 90, and 95%.

The polyester may be thermoplastic. The polyester (e.g., copolyester) of the film may be amorphous, or may be partially crystalline (semi-crystalline), such as with a crystallinity of at least about, or at most about, any of the following weight percentages: 10, 15, 20, 25, 30, 35, 40, and 50%.

Appearance Characteristics of the Film

The film may have low haze characteristics. Haze is a measurement of the transmitted light scattered more than 2.5° from the axis of the incident light. Haze is measured against the outside layer of the film. The "outside layer" is the outer layer of the film that is or is intended to be adjacent the space outside of a package comprising the film. (The "inside layer" of a film is the outer layer of the film that is or is intended to be adjacent the space inside of a package comprising the film.) Haze is measured according to the method of ASTM D 1003, which is incorporated herein in its entirety by reference. All references to "haze" values in this application are by this standard. The haze of the film may be at most about any of the following values: 30%, 25%, 20%, 15%, 10%, 8%, 5%, and 3%.

The film may have a gloss as measured against the outside layer of at least about any of the following values: 40%, 50%, 60%, 63%, 65%, 70%, 75%, 80%, 85%, 90%, and 95%. These percentages represent the ratio of light reflected from the sample to the original amount of light striking the sample at the designated angle. All references to "gloss" values in this application are in accordance with ASTM D 2457 (60° angle), which is incorporated herein in its entirety by reference.

The film may be transparent (at least in the non-printed regions) so that a packaged article may be visible through the film. "Transparent" means that the film transmits incident light with negligible scattering and little absorption, enabling objects (e.g., the packaged article or print) to be seen clearly through the film under typical viewing conditions (i.e., the expected use conditions of the material). The average transparency (i.e., clarity) of the film may be at least about any of the following values: 65%, 70%, 75%, 80%, 85%, and 90%, as measured in accordance with ASTM D1746. All references to "transparency" values in this application are by this standard.

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173-80 (July 1993), of which pages 173-80 is incorporated herein by reference.

Additives

A layer may include one or more additives useful in packaging films, such as, antiblocking agents, slip agents, antifog agents, colorants, pigments, dyes, flavorants, antimicrobial agents, meat preservatives, antioxidants, fillers, radiation stabilizers, and antistatic agents. Such additives, and their effective amounts, are known in the art.

A layer comprising polyamide may also comprise an effective amount of one or more nucleating agents and/or heat stabilizers. Effective amounts and types of nucleating agents and heat stabilizers are known to those of skill in the art.

One or more of any of the film layers described above—or any packaging film or layer thereof comprising thermoplastic polymer—may comprise one or more of any of the ultraviolet ("UV") light absorbers described below. This may be useful, for example, if the film would otherwise transmit UV light and it is desired to reduce the UV light exposure of the contents packaged within a package comprising the film. Any such film may also have any of the appearance characteristics discussed above.

The film layer may comprise at least about 0.1, 0.2, 0.3, 0.4, 0.5, 0.7, 0.9, and 1%, and/or at most about 2, 1.8, 1.5, 1.2, 1, 0.8, 0.6, 0.5, 0.3% of UV light absorbers, such as any of the UV light absorbers described below, based on the weight of the layer. The film layer may comprise a first UV light absorber, such as those described below, in any of the previous amounts in combination with a second UV light absorber, such as those described below, in any of the previous amounts. The weight ratio of the first to second UV light absorbers in a layer may be at least about and/or at most about any of following: 0.1:1, 0.2:1, 0.4:1, 0.5:1, 0.8:1, 1:1, 1.1:1, 2:1, 2.5:1, 3:1, 4:1, 5:1, 8:1, 10:1, and 20:1.

It is believed that the use of 2-(2Hydroxy-3-tert-butyl-5-methylphenyl)-5-chlorobenzotriazole (e.g., Ciba Geigy TINUVIN 326) as the first UV light absorber in a film (e.g., a film comprising one or more thermoplastic polymers) combined with 2-[2-Hydroxy-3,5-di-(1,1-dimethylbenzyl)phenyl]-2H-benzotriazole (e.g., Ciba Geigy TINUVIN 234) as a second UV light absorber in a film, for example, in any of the ratios set forth above, provides good UV transmission absorption over a wide range of UV wavelengths, for example, blocking or absorbing at least about 80% of the transmission of UV light (up to 400 nm wavelength) through a 3-mil thick polymer film.

Useful UV light absorbers may include compounds available from Ciba Giegy under the Ciba® TINUVIN® P; Ciba® TINUVIN® 213; Ciba® TINUVIN® 234; Ciba® TINUVIN® 326; Ciba® TINUVIN® 327; Ciba® TINUVIN® 328; Ciba® TINUVIN® 571 trademarks; as well as compounds in the class known as hindered amine/amide light stabilizers ("HALS"), such as those available from Ciba Geigy under the Ciba® CHIMASSORB® 944; Ciba® TINUVIN® 765; Ciba® TINUVIN® 123; Ciba® TINUVIN® 770; and Ciba® TINUVIN® 622 trademarks.

Useful UV light absorbers may also include compounds in the benzophenone class of UV absorbers, such as 2-Hydroxy-4-methoxy benzophenone (e.g., Cyasorb UV 9); 2-Hydroxy-4-octoxy benzophenone (e.g., Cyasorb 531); and compounds in the benzotriazole class of UV absorbers, such as 2-(2Hydroxy-3-tert-butyl-5-methylphenyl)-5-chlorobenzotriazole (e.g., Ciba Geigy TINUVIN 326); 2-(2Hydroxy-3-tert-butyl-5-methylphenyl)-5-chlorobenzotriazole (e.g., Ciba Geigy TINUVIN 327); 2-(2H-hydroxy-3-5-Di-tert-Amyllphenyl) benzotriazole (e.g., Ciba Geigy TINUVIN 328); 2-(2-Hydroxy-5-tert-octylphenyl) benzotriazole (e.g., Ciba Geigy TINUVIN 329); 2-(2H-hydroxy-3-5-Di-tert-Butylphenyl) benzotriazole (e.g., Ciba Geigy TINUVIN 320); 2-(2-Hydroxy-5-methyl phenyl) benzotriazole (e.g., Ciba Geigy TINUVIN P); and 2-[2-Hydroxy-3,5-di-(1,1-dimethylbenzyl)phenyl]-2H-benzotriazole (e.g., Ciba Geigy TINUVIN 234).

Useful UV light absorbers may also include bis(1,2,2,6,6-pentamethyl-4-piperidyl)sebacate; 1-(Methyl)-8-(1,2,2,6,6-pentamethyl-4-piperidinyl)sebacate; and poly[1-(2'-Hydroxyethyl)-2,2,6,6-tetramethyl-4-hydroxy piperidylsuccinate (e.g., Ciba Geigy TINUVIN 622).

It is believed that the use of 2-(2Hydroxy-3-tert-butyl-5-methylphenyl)-5-chlorobenzotriazole (e.g., Ciba Geigy TINUVIN 326) as a UV absorber in a film (e.g., a film comprising one or more thermoplastic polymers) results in reduced migration of the UV absorber to the surface of the film in comparison to, for example, the use of 2-[2-Hydroxy-3,5-di-(1,1-dimethylbenzyl)phenyl]-2H-benzotriazole (e.g., Ciba Geigy TINUVIN 234) as a UV absorber in a film. This reduced migration to the surface (i.e., reduced "bloom") is beneficial because it may result in a less hazy film, for example a film having a haze of less than 5%. Accordingly, it may be beneficial when using the combination of these two UV light absorbers to have the 2-(2Hydroxy-3-tert-butyl-5-methylphenyl)-5-chlorobenzotriazole (e.g., Ciba Geigy TINUVIN 326) as the major component relative to the 2-[2-Hydroxy-3,5-di-(1,1-dimethylbenzyl)phenyl]-2H-benzotriazole (e.g., Ciba Geigy TINUVIN 234).

Heat Shrink

The film may have a heat-shrinkable attribute. For example, the film may have a free shrink in at least one direction (i.e., machine or transverse direction) and/or in at least each of two directions (machine and transverse directions) at 220° F. of at least about any of the following: 5%, 7%, 10%, 15%, 20%, 25%, 30%, 40%, 50%, 55%, 60%, and 65%. Further, the film may have any of a free shrink in at least one direction (machine or transverse direction) and/or in at least each of two directions (machine and transverse directions) of at least about any of these listed shrink values when measured at any of 100° F., 120° F., 140° F., 160° F., 185° F., 190° F., 200° F., and 210° F. Unless otherwise indicated, each reference to free shrink in this application means a free shrink determined by measuring the percent dimensional change in a 10 cm×10 cm specimen when subjected to selected heat (i.e., at a certain temperature exposure) according to ASTM D 2732. The film may be non-heat shrinkable (i.e., having a free shrink at 100° F. in any direction of less than 5%).

Manufacture and Use of the Film

The film may be manufactured by thermoplastic film-forming processes known in the art (e.g., tubular or blown-film extrusion, coextrusion, extrusion coating, flat or cast film extrusion). The film may also be prepared by applying one or more layers by extrusion coating, adhesive lamination, extrusion lamination, solvent-borne coating, or by latex coating (e.g., spread out and dried on a substrate). A combination of these processes may also be employed, for example, so that one film portion comprising one or more layers is formed by coextrusion and another film portion comprising one or more layers is laminated to the first portion of the film.

The film may be oriented or non-oriented. The film may be oriented in either the machine (i.e., longitudinal) or the transverse direction, or in both directions (i.e., biaxially oriented), for example, in order to enhance the optics, strength, and durability of the film. For example, the film may be oriented in one of the machine or transverse directions or in both of these directions by at least about any of the following ratios: 2:1, 2.5:1, 2.7:1, 3:1, 3.5:1, and 4:1. The film may be oriented in one of the machine or transverse directions or in both of these directions by at most about any of the following ratios: 10:1, 9:1, 8:1, 7:1, 6:1, 5:1, and 4:1. If the film is oriented, then it may be heat set or annealed after orientation to reduce the heat shrink attribute to a desired level or to help obtain a desired crystalline state of the film.

The film may be used in packaging an article or object, for example, packaging food or hygiene products such as toothpaste. The film may be formed into a package, such as a bag, tube, or pouch, for example, so that the package comprises the film. In forming the package, the film may be heat sealed or adhesively sealed to either another film or to itself (for example, by a fin seal and/or a lap seal arrangement) to form the package (e.g., bag, pouch, tube, or other containment configuration). Heat sealing may occur by one or more of thermal conductance heat sealing, impulse sealing, ultrasonic sealing, and dielectric sealing.

The following examples are presented for the purpose of further illustrating and explaining the present invention and are not to be taken as limiting in any regard. Unless otherwise indicated, all parts and percentages are by weight.

Example 1

A nine-layer film having a 2.6 mil thickness and the following structure was made by coextrusion:

1/2/3/4/5/6/7/8/9 where the number represents a film layer and the slash represents a film layer interface. Table 1 shows more detail about the film composition and structure.

TABLE 1

| Film Layer | Composition | Thickness (mils) |
|---|---|---|
| 1 | 97.5% LDPE; 2% MB; 0.5% UVA1 | 0.3 |
| 2 | 99.5% LDPE; 0.5% UVA1 | 0.5 |
| 3 | 100% LLDPE(mod) | 0.2 |
| 4 | 80% PA-6; 19.5% PA-6, I/6, T(mod); 0.125% UVA1; 0.375 UVA2 | 0.15 |
| 5 | 99% PA-6, I/6, T(mod); 0.25% UVA1; 0.75% UVA2 | 0.3 |
| 6 | 80% PA-6; 19.5% PA-6, I/6, T(mod); 0.125% UVA1; 0.375 UVA2 | 0.15 |
| 7 | 100% LLDPE(mod) | 0.2 |
| 8 | 99.5% LDPE; 0.5% UVA1 | 0.5 |
| 9 | 97.5% LDPE; 2% MB; 0.5% UVA1 | 0.3 |

LDPE is a low density polyethylene polymer.
MB is a masterbatch comprising antiblock agent.
UVA1 is 2-[2-Hydroxy-3,5-di-(1,1-dimethylbenzyl)phenyl]-2H-benzotriazole ultraviolet light absorber available from Ciba Geigy under the TINUVIN 234 trademark.
UVA2 is 2-(2Hydroxy-3-tert-butyl-5-methylphenyl)-5-chlorobenzotriazole ultraviolet light absorber available from Ciba Geigy under the TINUVIN 326 trademark.
LLDPE(mod) is an anhydride-modified linear low density polyethylene.
PA-6 is a nylon-6.
PA-6, I/6, T(mod) is a modified amorphous nylon-6, I/6, T available from EMS-Grivory under the Grivory FE 5746 development product number, believed to have 88 mole % of modified amino end groups relative to the total amount of free (unmodified) and modified amino end groups, and a mole ratio of free amino end groups to free carboxyl end groups of about 12:100.

The resulting Example 1 film had good intra-film bond strength. The layers of the Example 1 film did not separate from each other after handling. The film blocked at least about 80% of the transmission of UV light for wavelengths up to 400 nm.

Example 2

A film was made the same as the Example 1 film—except that layers 1, 2, 8, and 9 each had 0.375% UVA2 and 0.125% UVA1 rather than 0.5% UVA1. The resulting Example 2 film had good intra-film bond strength. The layers of the Example 2 film did not separate from each other after handling. The Example 2 film blocked at least about 80% of the transmission of UV light for wavelengths up to 400 nm.

After a day to allow for any "blooming" of the UV light absorber to the surface of the films, the Example 2 film was observed to have much better (i.e., lower) haze characteristics and better (i.e., higher) transparency characteristics than the Example 1 film and the Example 3 film (discussed below). This is believed to occur because the majority of the UV light absorbers, in the outer layers and next to outer layers, in the Example 2 film was UVA2, rather than UVA1 as in the Examples 1 and 3 films.

Example 3

A film was made the same as the Example 1 film—except that layers 1, 2, 8, and 9 had 0.375% UVA1 and 0.125% UVA2 rather than 0.5% UVA1. The resulting Example 3 film had good intra-film bond strength. The layers of the Example 3 film did not separate from each other after handling. The Example 3 film blocked at least about 80% of the transmission of UV light for wavelengths up to 400 nm.

Example 4

A nine-layer film having a 9.8 mil thickness and the following structure was made by coextrusion:

1/2/3/4/5/6/7/8/9 where the number represents a film layer and the slash represents a film layer interface. Table 2 shows more detail about the Example 4 film composition and structure.

TABLE 2

| Film Layer | Composition | Thickness (mils) |
|---|---|---|
| 1 | 98% LDPE; 2% MB | 2.2 |
| 2 | 99.5% LDPE; 0.5% UVA1 | 1.5 |
| 3 | 100% LLDPE(mod) | 0.5 |
| 4 | 100% PA-6 | 0.4 |
| 5 | 100% PA-6, I/6, T(mod) | 0.6 |
| 6 | 100% PA-6 | 0.4 |
| 7 | 100% LLDPE(mod) | 0.5 |
| 8 | 99.5% LDPE; 0.5% UVA1 | 1.5 |
| 9 | 98% LDPE; 2% MB | 2.2 |

The resulting Example 4 film had good intra-film bond strength. The layers of the Example 4 film did not separate from each other after handling.

Any numerical values recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:

1. A multilayer film comprising:
    a first layer comprising one or more modified polyamides;
    a second layer comprising at least about 40% of one or more unmodified polyamides, based on the weight of the second layer; and
    a third layer comprising at least about 40% of one or more tie polymers selected from ethylene/vinyl acetate copolymer, ethylene/(meth)acrylic acid copolymer, ethylene/$C_1$-$C_{12}$ alkyl (meth)acrylate copolymer, and anhydride-modified polyolefin, based on the weight of the third layer; wherein
    the second layer is directly adhered to the first and third layers.

2. The film of claim 1 wherein the first layer comprises at least about 40% of one or more modified amorphous polyamides, based on the weight of the first layer.

3. The film of claim 1 wherein the first layer comprises one or more modified amorphous polyamides in an amount sufficient to impart to the film an oxygen transmission rate of at most about 150 cubic centimeters (at standard temperature and pressure) per square meter per day per 1 atmosphere of oxygen pressure differential measured at 0% relative humidity and 23° C.

4. The film of claim 1 wherein the first layer comprises at least about 40% modified nylon-6,I/6,T, based on the weight of the first layer.

5. The film of claim 1 wherein the first layer comprises at least about 40% of one or more modified amorphous polyamides, based on the weight of the first layer, wherein the one or more modified amorphous polyamides have at least about 40 mole % modified amino end groups relative to the total amount of free and modified amino end groups of the one or more modified amorphous polyamides.

6. The film of claim 1 wherein the first layer comprises one or more modified amorphous polyamides, wherein the one or more modified amorphous polyamides have a mole ratio of free amino end groups to free carboxyl end groups of less than about 50:100.

7. The film of claim 1 wherein the first layer comprises at least about 40% of one or more modified polyamides, based on the weight of the first layer.

8. The film of claim 1 wherein the first layer comprises one or more modified amorphous polyamides.

9. The film of claim 1 wherein the second layer comprises at least about 70% of one or more unmodified polyamides, based on the weight of the second layer.

10. The film of claim 1 wherein the second layer comprises at least about 90% of one or more unmodified polyamides, based on the weight of the second layer.

11. The film of claim 1 wherein the one or more unmodified polyamides of the second layer are selected from one or more of nylon-6; nylon-6,6; nylon-6,12; nylon-12; and nylon-6,6/6.

12. The film of claim 1 wherein the third layer comprises at least about 70% of the one or more tie polymers, based on the weight of the third layer.

13. The film of claim 1 wherein the one or more tie polymers of the third layer comprise anhydride-modified polymer.

14. The film of claim 1 wherein the one or more tie polymers of the third layer comprise anhydride-modified ethylene/vinyl acetate copolymer.

15. The film of claim 1 wherein the wherein the one or more tie polymers of the third layer comprise anhydride-modified ethylene/$C_1$-$C_{12}$ alkyl (meth)acrylate copolymer.

16. The film of claim 1 wherein the one or more tie polymers of the third layer comprise ethylene/vinyl acetate copolymer.

17. The film of claim 1 wherein the one or more tie polymers of the third layer comprise ethylene/(meth)acrylic acid copolymer.

18. The film of claim 1 wherein the one or more tie polymers of the third layer comprise ethylene/$C_1$-$C_{12}$ alkyl (meth)acrylate copolymer.

19. The film of claim 1 wherein the one or more tie polymers of the third layer comprise ethylene/vinyl acetate copolymer having a vinyl acetate content of at least about 25 weight %.

20. The film of claim 1 further comprising a fourth layer directly adhered to the third layer, the fourth layer comprising one or more polyolefins.

21. A package comprising the film of claim 1.

22. A multilayer film comprising:
- a first layer comprising at least about 40% of one or more modified polyamides, based on the weight of the first layer;
- a second layer comprising at least about 40% of one or more unmodified polyamides, based on the weight of the second layer; and
- a third layer comprising at least about 40% of one or more tie polymers selected from ethylene/(meth)acrylic acid copolymer and ethylene/$C_1$-$C_{12}$ alkyl (meth)acrylate copolymer, based on the weight of the third layer; wherein the second layer is directly adhered to the first and third layers.

23. A multilayer film comprising:
- a first layer comprising at least about 40% of one or more modified polyamides, based on the weight of the first layer;
- a second layer comprising at least about 40% of one or more unmodified polyamides, based on the weight of the second layer; and
- a third layer comprising at least about 40% of anhydride-modified ethylene/$C_1$-$C_{12}$ alkyl (meth)acrylate copolymer, based on the weight of the third layer; wherein the second layer is directly adhered to the first and third layers.

* * * * *